Oct. 3, 1967     D. M. CUMMINGS     3,345,118

DESK FOR USE IN VEHICLES

Filed Dec. 30, 1965

INVENTOR
DAVID M. CUMMINGS
BY
Attorney

United States Patent Office 3,345,118
Patented Oct. 3, 1967

3,345,118
DESK FOR USE IN VEHICLES
David M. Cummings, 8 Maple Ave.,
Ripley, N.Y. 14775
Filed Dec. 30, 1965, Ser. No. 518,969
4 Claims. (Cl. 312—235)

ABSTRACT OF THE DISCLOSURE

This invention relates to furniture and, more particularly, to a desk for use in an automobile.

Salesmen and other persons who spend a great deal of time in their automobile during the course of their business frequently have considerable office work to do while traveling away from their home and their office. Salesmen who go on extended sales trips often need various files containing records of their customers and their products. The ordinary automobile does not have a suitable place to carry such files or to enable the salesman to do desk work.

---

Applicant has discovered that by providing a desk designed to be supported on the seat of an automobile containing filing space and with a top having a suitable work space, the salesman's work can be carried out much easier and more conveniently. The desk can be provided with a suitable top to write on and to support road maps during travel.

It is, accordingly, an object of the invention to provide an improved desk.

Another object of the invention is to provide an improved desk having a suitable size and shape to be received in an automobile.

Another object of the invention is to provide a desk having a desk space on top to receive papers, road maps, and the like.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
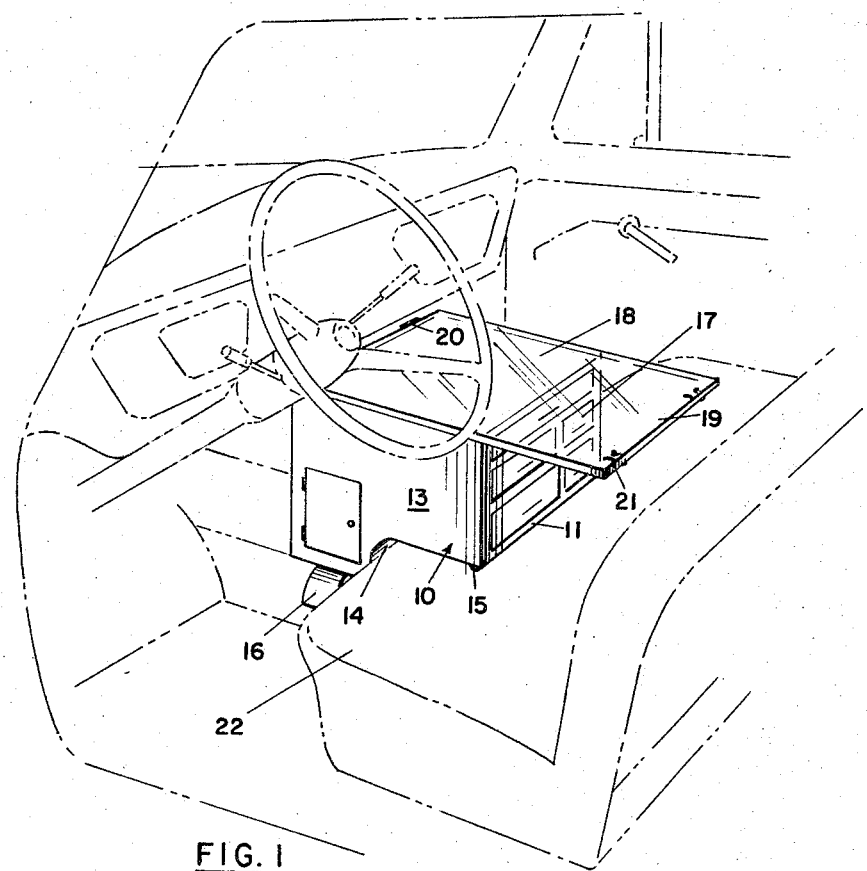
FIG. 1 is an isometric view showing the desk supported on an automobile shown in phantom lines.
Figures 2, 3:
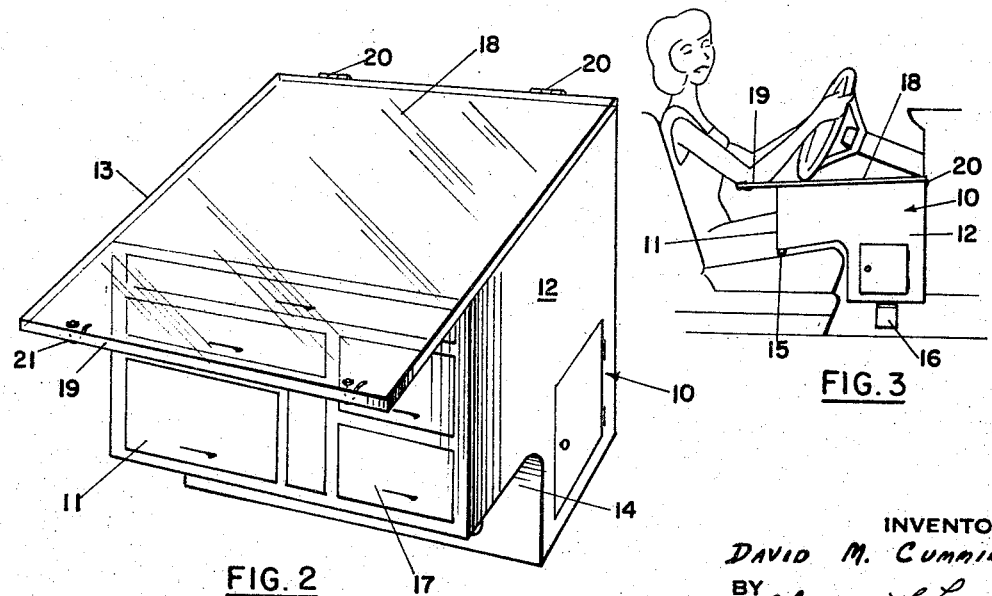
FIG. 2 is an enlarged isometric view of the desk shown in FIG. 1.
FIG. 3 is a side view of the desk supported in an automobile shown partially.

Now with more particular reference to the drawing, the automobile shown has a seat cushion 22 and a ridge running up through the front along the floor. This ridge supports the bracket member 16, which is fixed to the desk 10. The desk 10 itself has sides 12 and 13, a front, and a back. The desk has a top 18 hinged at 20 to the back of the desk. The drawers 11 and 17 are shown by way of example, which may provide storage space in the desk. The doors at the sides of the desk may also provide storage space. The desk top 18 has a front edge 19 to which are attached the clips 21. The clips 21 may be used to support a road map or the like on the top of the desk.

The cover of the desk may be swung upwardly to provide access to the inside thereof. The sides of the desk are contoured at 14 and have bumpers 15 thereon to rest on the seat cushion to prevent it from being injured.

When the desk is supported over the ridge of the auto body by means of the U-shaped brackets 16, the front edge of the desk just clears the instrument panel of the automobile and the front 11 of the desk is spaced forward from the seat cushion back to provide access to the drawers, as shown. The top 18 overhangs the drawers and the desk front.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A desk for use in a vehicle comprising,
   a desk having sides, a front, and a top,
   a recess formed in said front and sides adapted to receive a part of a seat cushion of said vehicle whereby said desk rests on said seat cushion,
   said top being disposed above said recess an amount such that when said desk rests on said seat cushion, said top is at a convenient height for writing purposes by a person sitting on said seat beside said desk drawers formed in said desk in the front thereof and said top overhanging said front an amount sufficient to allow said drawers to be moved to open position below said top.

2. The desk recited in claim 1 wherein said top is hinged to said desk at its rear edge and may be swung to open positon.

3. The desk recited in claim 1 wherein said support means comprises a U-shape member adapted to receive a part of said vehicle.

4. The seat recited in claim 3 wherein
   said seat is provided in combination with an automotive vehicle,
   said U-shaped member supporting said desk above the floor of said autmative vehicle,
   and said recess receiving the front edge of the seat cushion of said automotive vehicle,
   the top of said desk extending rearwardly toward the back of said seat,
   and the front of said desk being spaced therefrom.

References Cited

UNITED STATES PATENTS

| 2,354,106 | 7/1944  | Cooper    | 312—194 X |
| 2,934,391 | 4/1960  | Bohnott   | 108—44 X  |
| 3,061,394 | 10/1962 | Whetstone | 312—235 X |
| 3,163,287 | 12/1964 | Barnett   | 108—44 X  |
| 3,279,872 | 10/1966 | Howke     | 312—235   |

CASMIR A. NUNBERG, *Primary Examiner.*